(12) United States Patent
Hirsch et al.

(10) Patent No.: US 8,512,563 B2
(45) Date of Patent: Aug. 20, 2013

(54) HOUSING POT FOR ACCOMMODATING A FILTER ELEMENT IN A FILTER DEVICE

(75) Inventors: Melanie Hirsch, Speyer (DE); Frank Vogt, Hanhofen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/564,353

(22) Filed: Aug. 1, 2012

(65) Prior Publication Data

US 2012/0305470 A1    Dec. 6, 2012

Related U.S. Application Data

(63) Continuation of application No. PCT/EP2010/067485, filed on Nov. 15, 2010.

(30) Foreign Application Priority Data

Feb. 2, 2010  (DE) .......................... 10 2010 006 715

(51) Int. Cl.
*B01D 27/00* (2006.01)
*B01D 35/30* (2006.01)
*B01D 29/00* (2006.01)

(52) U.S. Cl.
USPC ............ 210/248; 210/435; 210/450; 210/455

(58) Field of Classification Search
None
See application file for complete search history.

(56) References Cited

U.S. PATENT DOCUMENTS

| 2,230,408 A |   | 2/1941  | Charlie |         |
|-------------|---|---------|---------|---------|
| 2,646,884 A |   | 7/1953  | Findley |         |
| 3,450,146 A |   | 6/1969  | Edwards |         |
| 4,707,168 A |   | 11/1987 | Mizutani |        |
| 5,144,978 A | * | 9/1992  | Brown et al. ................. | 137/588 |

FOREIGN PATENT DOCUMENTS

| DE | 7026232      | 3/1971 |
|----|--------------|--------|
| DE | 102006059560 | 6/2008 |
| JP | 63071510 A   | 3/1988 |

* cited by examiner

*Primary Examiner* — Benjamin Kurtz
(74) *Attorney, Agent, or Firm* — James Hesselbeck

(57) ABSTRACT

A housing pot for accommodating a filter element in a filter device includes a recess into which a bushing having a form-fit element is inserted. The form-fit element engages with the edge delimiting the recess in the bottom of the housing pot in a form-fit manner.

11 Claims, 2 Drawing Sheets

HOUSING POT FOR ACCOMMODATING A FILTER ELEMENT IN A FILTER DEVICE

CROSS REFERENCE TO RELATED APPLICATIONS

This application is US bypass Continuation application of international patent application no. PCT/EP2010/067485 filed Nov. 15, 2010 designating the United States of America, the entire disclosure of which is incorporated herein by reference. Priority is claimed based on German patent application no. 10 2010 006 715.6 filed Feb. 2, 2010.

TECHNICAL FIELD

This present invention is related to a housing pot for accommodating a filter element in a filter device.

BACKGROUND OF THE INVENTION

Fluid filters with a filter element that is arranged in a housing pot of metal and through which the fluid to be filtered flows are known. Hollow-cylindrical filter elements are typically flowed through in radial direction from the exterior to the interior wherein the purified fuel is drained axially from the interior of the filter element. At the bottom of the pot-shaped filter housing there may be a discharge device by means of which separated water can be discharged. The discharge device may include a conduit socket that is welded to the metal of the housing pot. However, welding such sockets or nuts carries the risk of material failure during the service life of the filter device because of the pressure pulsations occurring within the interior of the housing.

Therefore, there remains a need in the art for a housing pot accommodating a filter element in a filter device that accommodates a discharge device without limiting the service life as in the prior art.

SUMMARY OF THE INVENTION

The invention has the object to provide, by means of simple measures, a housing pot for accommodating a filter element in a filter device with a discharge device, without limiting the service life.

The housing pot according to the invention serves for accommodating a filter element in a filter device that is, for example, a fuel filter or an exchangeable filter with drain screw, an air de-oiling box or the fuel prefilter system sold under the trademark PRELINE. The filter pot may be cylindrical wherein, in the context of the invention, also deviating cross-sectional geometries are conceivable, for example, oval cross-sections or rectangular cross-sections that have optionally rounded narrow sides.

The discharge device may include a bushing that is embodied as a separate component and may be provided with a form-fit element, for example, a collar, that projects into a cutout in the bottom of the housing pot and that, by form fit, engages the edge that delimits the cutout in the bottom. This configuration has the advantage that welding of the bushing in the bottom of the housing pot is eliminated so that the risk of a pulsation-critical connection between the bushing and the wall of the housing pot is reduced. Moreover, the connection between bushing and housing pot can be realized in a simple, inexpensive and quickly executable way because only a mechanical connection is provided that, for example, can be produced by means of a press punch or a die or a similar means. Form fit between form fit element of the bushing and the edge of the wall that delimits the cutout in the bottom enables at the same time a connection with sufficient safety for receiving forces, including the pressure pulsations which occur, for example, in use as a fuel filter in internal combustion engines.

The housing pot that preferably consists of metal enables introduction of the cutout in the pot bottom by way of punching or stamping the cutout. In the next step, the bushing is inserted and by means of a suitable tool, such as a press punch or a die, the form-fit element, in particular the bushing collar, is deformed to such an extent that the edge of the cutout in the pot bottom is form-fittingly engaged by the bent collar. In this connection, the collar is inserted axially from the exterior or the interior into the cutout and subsequently is bent in radial direction outwardly until the edge of the cutout is clamped between a shoulder of the bushing and a sidewall of the collar.

For improving the sealing action, it may be expedient to provide between the form-fit element and the edge of the cutout a sealing material, either a deformable sealing mass that during the assembly process is distributed between the edge and the form-fit element or a sealing ring that is placed about the form-fit element, in particular about the collar.

The form-fit element on the bushing is preferably embodied as an axially extending deformable collar on the bushing that, for producing the form fit, is bent over radially. Basically, other embodiments of form-fit elements are possible also, for example, hooks or clips that are moveable into a form-fit position on the edge that delimits the cutout in the bottom. Embodiments with plastically deformable form-fit elements are possible in which the form-fit action is achieved by deformation as well as form-fit elements that, without deformation or with elastic deformation, are transferred into the form-fit position.

The bushing has a central flow opening that is positioned coaxial to the cutout in the pot bottom and by means of which separated fluid or separated particles can be discharged from the housing pot. In an advantageous embodiment, it is provided that the bushing is configured as a punched nut that can be embodied with an inner thread, for example, for receiving a drain screw or a similar component.

According to a further expedient embodiment, it is provided that only the form-fit element of the bushing projects into the interior of the housing pot while the bushing body is located outside of the housing pot. Basically, it is sufficient for a form-fit as well as flow-tight connection between bushing and housing pot that only the form-fit element of the bushing projects into the housing interior. Moreover, an embodiment is also possible in which the form-fit element of the bushing is outside of the housing pot and the bushing body projects into the interior of the housing pot.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
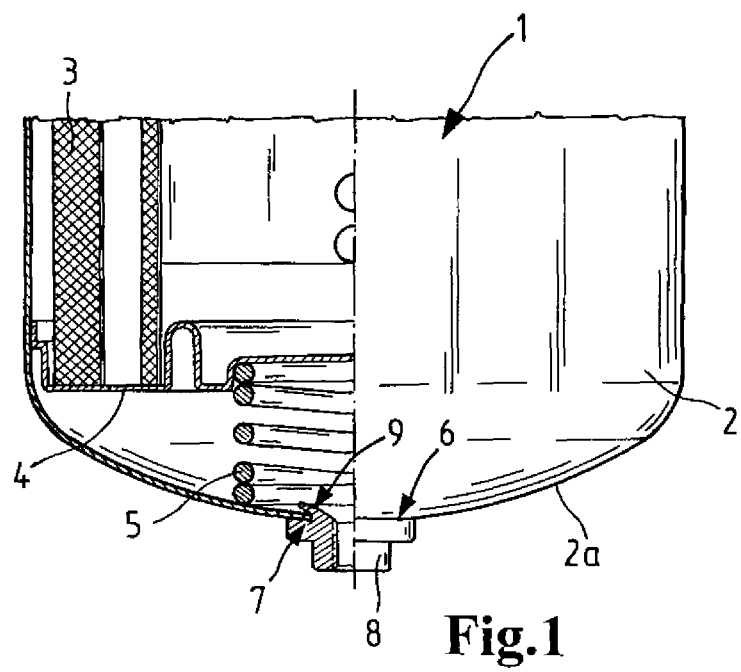
FIG. 1 depicts a filter device with a housing pot, illustrated partially in section, in which a filter element is inserted wherein the bottom of the housing pot is provided with a cutout with a punched nut that is form-fittingly inserted therein.

In the Figures, same components are provided with the same reference characters. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to an improved filter housing pot with a discharge device. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In FIG. 1, a filter device 1 is illustrated that is used as a liquid filter, for example, for filtration of oil or fuel in motor vehicles. The filter device 1 comprises as a housing a housing pot 2 in which a cylindrical filter element 3 is inserted that is flowed through by the fluid to be purified in radial direction from the exterior to the interior. The purified fluid is subsequently discharged in axial direction through a discharge passage from the interior of the filter element 3. The filter element 3 has on the side that is facing the bottom 2a of the housing pot 2 an end disk 4 by means of which the filter element 3 is supported on a spring element 5 that is embodied as a pressure spring and is supported on the inner side of the housing bottom 2a.

In the bottom 2a of the housing pot a central cutout 6 is introduced that is delimited by a housing edge 7. A bushing embodied as a punched nut 8 is inserted as a connecting component into the cutout 6 and is form-fittingly connected to the edge 7 that delimits the cutout 6.

The housing pot 2 is comprised in particular of metal wherein the cutout 6 is introduced by means of punching into the housing bottom 2a.

Figure 2:
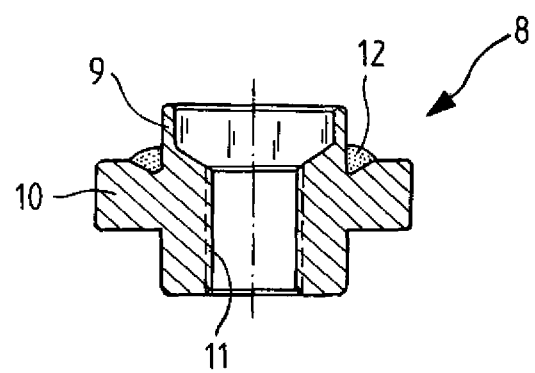
FIG. 2 shows the punched nut in section in an individual view.

In FIG. 2, the punched nut 8 is shown in section in an enlarged detail illustration. The punched nut 8 has a shoulder 10 that extends in radial direction outwardly and has on its end face an axially projecting cylindrical collar 9. The collar 9 has a relatively thin wall thickness so that it is possible to deform the collar 9 by bending without damaging the main part of the punched nut.

The punched nut 8 is moreover provided with a central bore 11 that serves for draining liquids. An inner thread is provided in the bore 11. The collar 9 has an inner diameter that is greater than the diameter of the bore 11. As shown in FIG. 2, the shoulder 10 may be arranged on a radial exterior of the punched nut 8 at an axial position radially over the central bore 11.

At the transition between the axial collar 9 and the correlated end face of the shoulder 10 there is sealing material 12 that serves for improving the sealing action between the housing pot and the punched nut. The sealing material 12 is, for example, embodied as a sealing mass that is flowable under pressure and fills a gap between the end face of the collar 10 and the edge 7 of the bottom 2a or the collar 9 and the edge 7. The sealing mass can be applied before as well as after insertion of the punched nut. Instead of a sealing mass the sealing material 12 can also be embodied as a sealing ring that is placed about the collar 9.

Figure 3:
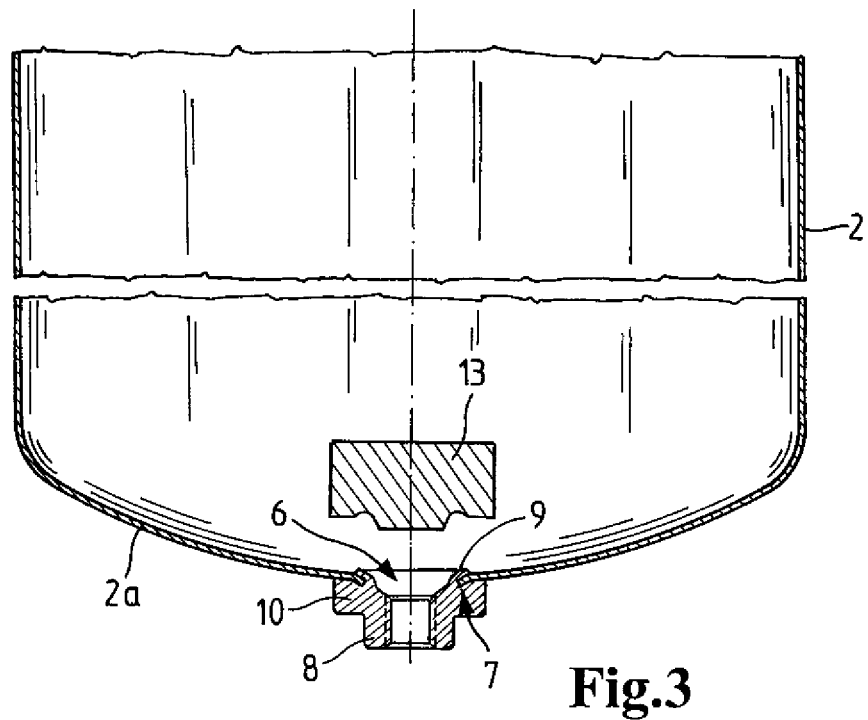
FIG. 3 depicts the housing pot with the punched nut arranged in the bottom area illustrated with a die for radial bending of a collar of the punched nut.

As illustrated in FIG. 3, in the inserted state the collar 9 of the punched nut 8 is bent in radial direction outwardly so that the edge 7 is clamped between the end face of the shoulder 10 and the facing lateral surface of the collar 9. In this way, a form-fit connection between the punched nut 8 and the bottom 2a of the housing pot 2 is achieved.

For deforming the collar 9, a die 13 is provided that is introduced axially through the interior of the housing pot 2 and has an end face contour that upon axial loading effects bending of the collar 9 in radial direction outwardly. By means of radial bending, the edge 7 that delimits the cutout 6 is form-fittingly engaged at the same time by the collar 9.

Figure 4:
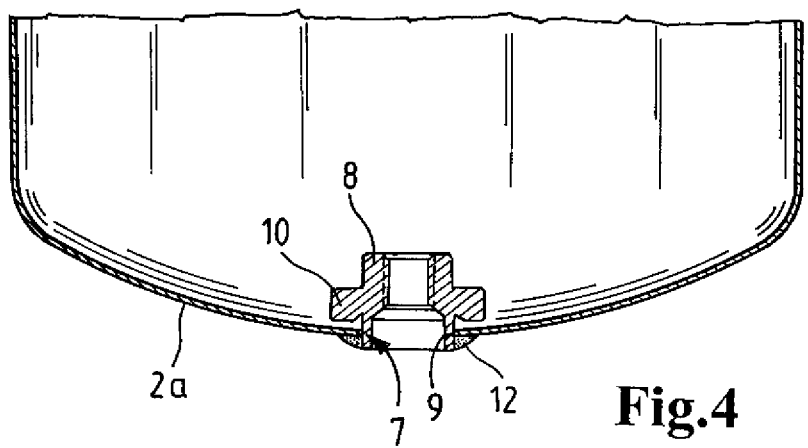
FIG. 4 depicts an embodiment in which the bushing body projects into the interior of the housing pot.

FIG. 4 shows an embodiment in which the bushing body of the punched nut 8 projects into the interior of the housing pot. The Figure shows the collar in the still undeformed state. A sealing mass 12 is applied about the edge 7 of the bottom 2a on the exterior side of the housing pot 2. The application of the sealing mass can be realized before insertion of the punched nut 8. Instead of the sealing mass the sealing material 12 can also be embodied as a sealing ring which is placed about the collar 9.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter housing pot for receiving a filter element in a filter device, comprising:
   a filter housing including
      said housing pot including a chamber within to receive said filter element;
      a housing bottom secured to and closing over an end of said housing pot, said housing bottom including a cutout extending through said housing bottom from an interior of said filter housing to an exterior, said cutout delimited by a form-fit edge;
      a discharge device inserted into said cutout and secured to said housing bottom, said discharge device including
         a bushing including;
            a first axial end face;
            an opposing second axial end face;
            a central bore having a first diameter, said central bore extending through said first axial end face of said bushing; and
         a form-fit element as an axially projecting deformable cylindrical collar arranged at said second axial end face of said bushing, said axial projecting cylindrical collar secured on said second axial end face and projecting axially outwardly from said bushing;
         wherein said deformable cylindrical collar has a bore diameter greater than said first diameter;
         a radially outward extending shoulder arranged on a radial exterior of said bushing at a position radially over said first diameter central bore and projecting in a radial direction outwardly from said bushing;
      wherein said form-fit element is one-piece unitary with said bushing; and
      wherein said form-fit element of said bushing is deformed after said insertion into said cutout to mountably engage with said form-fit edge of said cutout, said mountable engagement securing said bushing to said housing bottom.

2. The filter housing pot according to claim 1, wherein said deformable collar extends in an axial direction into and through said cutout.

3. The filter housing pot according to claim 2, wherein said collar is deformably bent radially outwardly to engage against and onto said form-fit edge,
   said collar engaging against an inner or an outer surface of said housing bottom at said form-fit edge.

4. The filter housing pot according to claim 1, further comprising
   a sealing material arranged at a transition between said axially projecting deformable collar and said shoulder;
   wherein said sealing material is arranged between said deformable collar and said form-fit edge,
   said sealing material providing a fluid tight seal between said housing bottom and said bushing.

5. The filter housing pot according to claim 1, wherein said housing pot is embodied as a metal component; and
   wherein said cutout is a punched cutout in said housing bottom.

6. The filter housing pot according to claim 3, wherein said bushing is embodied as a punched nut;
   wherein said central bore is threaded for releasable insertion of a drain screw into said central bore to releasably close off said central bore.

7. The filter housing pot according to claim 3, wherein
   wherein said shoulder is arranged at and abuts against an outside facing surface of said form-fit edge of said cutout; and
   wherein only said form-fit element of said bushing projects into said interior of said housing pot through said cutout.

8. The filter housing pot according to claim 3, wherein
   wherein said shoulder is arranged at and abuts against an inside facing surface of said form-fit edge of said cutout; and
   wherein only said form-fit element of said bushing projects outwardly through said cutout from said interior of said housing pot.

9. The filter housing pot according to claim 3, wherein
   a sealing material is arranged between said collar and said form-fit edge, said sealing material providing a fluid tight seal between said housing bottom and said bushing;
   wherein said housing pot is embodied as a metal component;
   wherein said cutout is a punched cutout in said housing bottom;
   wherein said bushing is embodied as a punched nut;
   wherein said central bore is threaded for releasable insertion of a drain screw into said central bore to releasably close off said central bore.

10. The filter housing pot according to claim 9, wherein said shoulder is arranged at and abuts against an outside facing surface of said form-fit edge of said cutout;
    wherein only said collar of said bushing projects into said interior of said housing pot through said cutout; and
    wherein said form-fit edge of said cutout is clamped between said bent collar and an end face of said shoulder.

11. The filter housing pot according to claim 9, wherein said shoulder is arranged at and abuts against an inside facing surface of said form-fit edge of said cutout; and
    wherein only said collar of said bushing projects outwardly through said cutout from said interior of said housing pot.

* * * * *